(12) United States Patent
Yamazaki

(10) Patent No.: US 6,175,191 B1
(45) Date of Patent: Jan. 16, 2001

(54) DRIVE CIRCUIT FOR EL ELEMENT

(75) Inventor: Hiroshi Yamazaki, Urawa (JP)

(73) Assignee: Seiko Precision Inc. (JP)

( * ) Notice: Under 35 U.S.C. 154(b), the term of this patent shall be extended for 0 days.

(21) Appl. No.: 09/348,367

(22) Filed: Jul. 7, 1999

(30) Foreign Application Priority Data

Jul. 8, 1998 (JP) .................................................. 10-193005

(51) Int. Cl.[7] .................................................... G09G 3/10
(52) U.S. Cl. .................................. 315/169.3; 315/209 R; 315/283; 315/360; 315/291
(58) Field of Search ............................ 315/169.3, 209 R, 315/291, 307, 226, 283, 360, 287, 241 R

(56) References Cited

U.S. PATENT DOCUMENTS

| 4,070,663 | 1/1978 | Kanatani et al. . | |
|---|---|---|---|
| 4,540,899 | 9/1985 | Pella . | |
| 5,313,141 | * 5/1994 | Kimball | 315/169.3 |
| 5,336,978 | * 8/1994 | Alessio | 315/169.3 |
| 5,349,269 | * 9/1994 | Kimball | 315/169.3 |
| 5,789,870 | * 8/1998 | Remson | 315/194 |
| 5,886,475 | * 3/1999 | Horiuchi et al. | 315/169.3 |
| 6,005,350 | * 12/1999 | Hachiya | 315/156 |

FOREIGN PATENT DOCUMENTS

| 2 317 722 | 2/1977 | (FR) . |
|---|---|---|
| 07-240289 | 9/1995 | (JP) . |

* cited by examiner

Primary Examiner—Haissa Philogene
(74) Attorney, Agent, or Firm—Amster, Rothstein & Ebenstein

(57) ABSTRACT

A drive circuit for an EL element is provided which suppresses abrupt discharge from the EL element. A coil and a first switch element are connected between a power terminal VDD and a power terminal VSS. The first switch element is intermittently turned on to charge an induced voltage occurring on the coil to the EL element through an H bridge circuit. Then, a second switch element is intermittently turned on to intermittently discharge the charge on the EL element through the coil, thereby suppressing abrupt discharge from the EL element.

10 Claims, 7 Drawing Sheets

DRIVE CIRCUIT FOR EL ELEMENT

BACKGROUND OF THE INVENTION

1. Field of the Invention

This invention relates to a drive circuit for an EL (Electroluminescent) element.

2. Description of the Related Art

There are examples at the present time of an EL element which is used as a backlight for a liquid crystal display provided on a small electronic appliance, such as a wristwatch. A drive circuit is required to generate an alternating current to drive an EL element of this kind. Although it has been a general practice to use a transformer as a voltage increasing element, this is not advantageous in encouraging size reduction.

FIG. 6 shows the type of drive circuit previously proposed. This circuit includes a voltage increasing circuit X1 to increase the voltage between a power terminal VDD and a power terminal VSS, and an H bridge circuit X3 to apply an output voltage of the voltage increasing circuit X1 to an EL element X2. The voltage increasing circuit X1 has a coil X4 and switch element X5 connected in series between the power terminal VDD and the power terminal VSS, and a diode X6 connected to a connection point between the coil X4 and the switch element X5. By intermittently turning on and off the switch element X5, an induced voltage is caused on the coil X4 and outputted through the diode X6. The H bridge circuit X3 has switch elements X7 and X8 connected in series between the diode X6 and the power terminal VSS, and switch elements X9 and X10 connected in series similarly between the diode X6 and the power terminal VSS, and an EL element X2 provided between a connection point between the switch elements X7 and X8 and a connection point between the switch elements X9 and X10, thereby charging and discharging the EL element in respective directions.

More explicitly, with reference to the timing graph of FIG. 7, if at time t0 the switch elements X7 and X10 are first turned on and then the switch element X5 begins intermittent on and off operation, the EL element X2 beings to be charged to a gradually increasing terminal-to-terminal voltage of the EL element X2 of approximately 100 V. Next, if at time t1 the switch element X5 is stopped from its intermittent on and off operation and the switch element X7 is turned off and the switch element X8 is turned on, then the voltage on the EL element X2 is discharged. Next, at time t2 the switch element X10 is turned off and the switch element X9 is turned on, and then the switch element X5 begins intermittent on and off operation. This causes the EL element X2 to be charged from the opposite terminal side thereof. Next, if at time t3 the switch element X5 is stopped from its intermittent on and off operation and the switch element X9 is turned off and the switch element X10 is turned on, then the voltage on the EL element X2 is discharged. By repeating the above operation, the EL element X2 is discharged in respective directions. Each switch element may be, for example, a bipolar transistor or a MOS transistor.

SUMMARY OF THE INVENTION

In the structure shown in FIG. 6, discharge is abruptly carried out in a short circuit state, thereby posing the following problems.

(1) Where the EL element uses a piezoelectric material, the abruptly changed charging voltage causes deformation in the EL element, producing sound.

(2) Instantaneous flow of electric current might cause burning at or around an electrode of the EL element where electric current concentrates.

(3) A large current at discharge causes radio wave noise, exerting noise on a peripheral circuit.

(4) Because the EL element has terminal-to-terminal voltage waveforms containing a high frequency component at discharge, the luminance half value period (life) becomes short.

(5) Because of the large flowing current, the transistor used as a switch element requires increased size.

Therefore, in the present invention, a coil and a switch element are provided on a discharge path for an EL element and the switch element is kept in the on position for a proper duration to cause intermittent discharge through the coil, thereby suppressing the EL element from abruptly discharging. Due to this, it is possible to suppress noise, electrode burning and reduce the size of the switch element.

In a drive circuit for an EL element in which the EL element is repeatedly gradually charged to increase the terminal-to-terminal voltage of the EL element to a required voltage and thereafter the voltage is discharged, a coil and a switch element are provided on a discharge path from the EL element such that the switch element is turned on for an appropriate duration so as to cause intermittent discharge through the coil.

Preferably, a drive circuit for an EL element comprises: a first switch element for intermittently connecting for a first time period a coil between a first power source and a second power source having a potential lower than the first power source, causing an induced voltage on the coil; an H bridge circuit for connecting the EL element in alternating directions between a terminal allowing output of the induced voltage and a terminal of the second power source; and a second switch element for intermittently connecting the terminal on the higher potential side of the EL element, charged by the induced voltage, to the coil for a second time period, after the first time period, to cause the EL element to discharge through the coil.

More preferably, a drive circuit for an EL element, comprises: a first switch element for intermittently connecting for a first time period a first coil between a first power source and a second power source having a potential lower than the first power source, causing an induced voltage on the coil; an H bridge circuit for connecting the EL element in alternating directions between a terminal allowing output of the induced voltage and a terminal of the second power source; and a second switch element for intermittently connecting the terminal on a higher potential side of the EL element, charged by the induced voltage, to a second coil for a second time period, after the first time period, to cause the EL element to discharge through the coil.

More preferably, the induced voltage is supplied to the EL element after a capacitor is charged, and the charge voltage of the capacitor being discharged together with discharge of the EL element through the coil.

More preferably, the intermittent discharge time starts out relatively short and is gradually increased.

DETAILED DESCRIPTION OF THE PREFERRED EMBODIMENT

Figure 1:
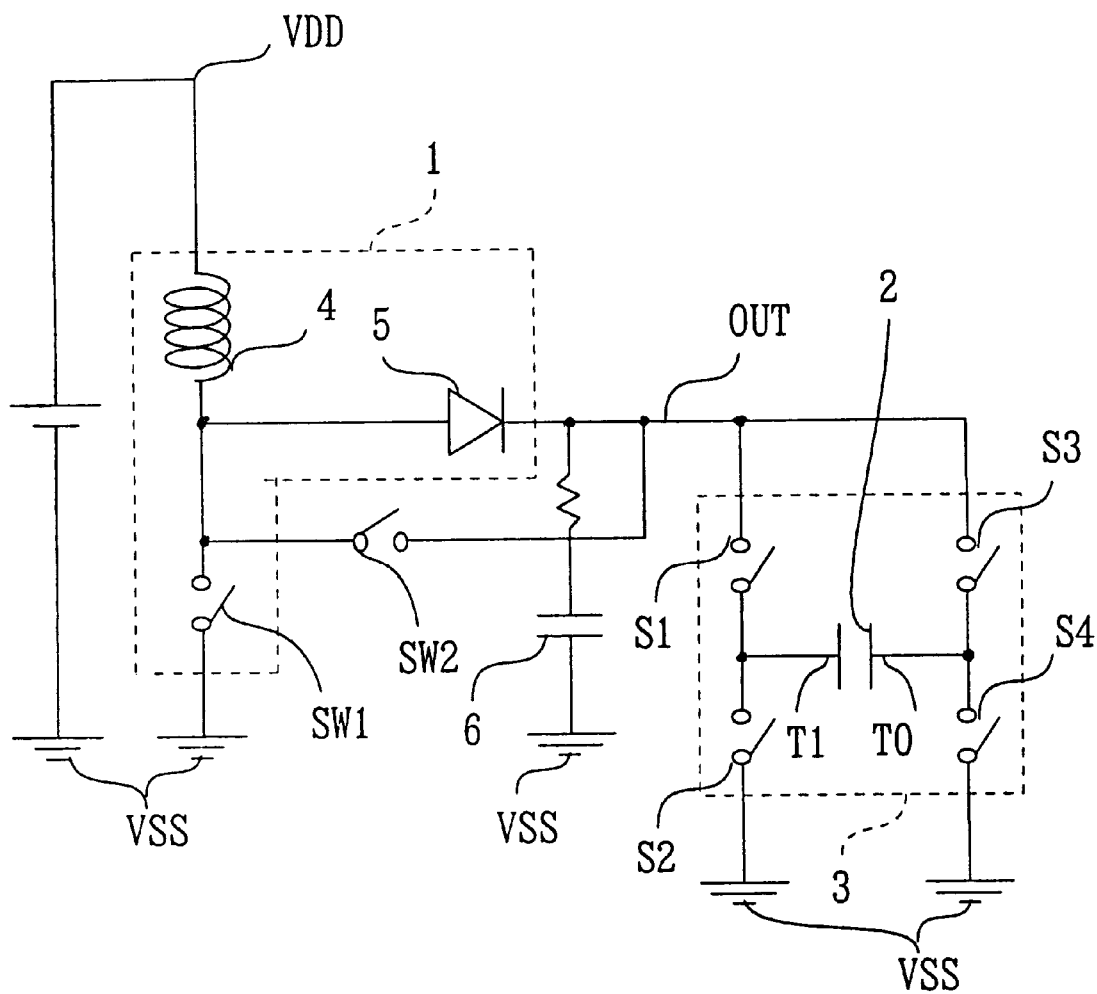
FIG. 1 is a diagram of the structure of a first embodiment of the present invention.

Now explained is a drive circuit for an EL element according to a first embodiment. FIG. 1 is an explanatory diagram showing a configuration of the first embodiment. The drive circuit for an EL element in the embodiment includes a voltage increasing circuit 1 to increase a voltage between a power terminal VDD and a power terminal VSS, and an H bridge circuit 3 to apply the output voltage of the voltage increasing circuit 1 to a EL element 2.

The voltage increasing circuit 1 has a coil 4 and a first switch element SW1 connected in series between the power terminal VDD and the power terminal VSS, and a diode 5 connected to a connection point between the coil 4 and the first switch element SW1. By intermittently turning on and off the first switch element SW1, an induced voltage is caused on the coil 4 and the voltage is output through the diode 5. Also, a capacitor 6 for output voltage stabilization is connected between an output side of the diode 5, (this connection point is designated output terminal OUT), and the power terminal VSS. It is possible to configure this embodiment to charge only the EL element 2 without there being a capacitor 6.

The H bridge circuit 3 has switch elements S1 and S2 connected in series between the output terminal OUT and the power terminal VSS, and switch elements S3 and S4 connected in series similarly between the output terminal OUT and the power terminal VSS. Between a connection point of the switch elements S1 and S2 and a connection point of the switch elements S3 and S4, the EL element 2 is connected so as to be charged and discharged in alternating directions.

Also, another switch element SW2 is provided between the connection point between the first switch element SW1 and the coil 4 and the output terminal OUT. The EL element 2 is discharged by allowing a current to flow toward the VDD side of the power terminal through this second switch element SW2 and the coil 4.

Although not shown, each of the above switch elements may be configured by a bipolar transistor, MOS transistor or the like, and properly controlled by a control circuit.

Figure 2:
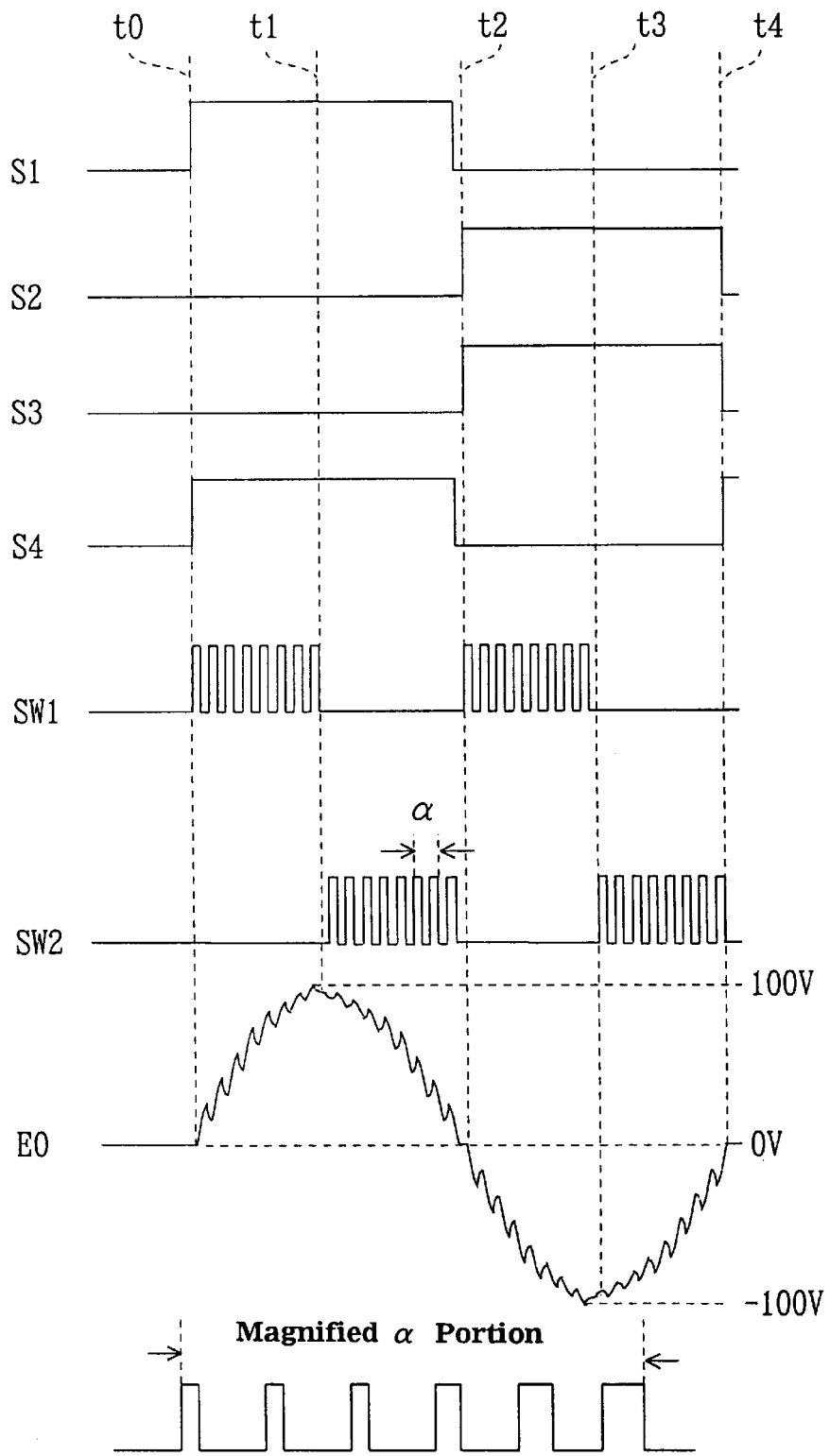
FIG. 2 is a timing chart for the operation of FIG. 1.

Now the operation of the present embodiment will be explained with reference to a timing chart of FIG. 2. In this figure, SW1 and SW2 respectively, represent the first and second switch elements SW1 and SW2 in on-off states. S1 to S4 show on-and-off states of the switch elements S1 to S4. "H" represents on and "L" represents off. Also, in the same figure, on timing is typically shown. The frequency of activation of the first or second switch elements (SW1 or SW2) is actually at 10 kHz to 50 kHz. In particular, the on duration of the second switch element SW2 gradually increases as illustrated in the α part magnification. Meanwhile, although not shown in the same figure, the frequency that the switch elements S1 to S4 turn on and off is 400 Hz to 500 Hz. Also, in the same figure E0 shows a terminal-to-terminal voltage across the EL element with respect to one terminal, using t0 of the EL element 2 as a reference.

First, at time t0 the switch elements S1 and S4 are turned on and then the first switch element SW1 is intermittently turned on and off. As a result, the capacitor 6 is charged and the gradual charging of the EL element 2 from the T1 side of the terminal begins. The terminal-to-terminal voltage of the EL element 2 is gradually increased to approximately 100 V.

Then, at time t1 the first switch element SW1 is no longer intermittently turned on and off, remaining off, and the second switch element SW2 is intermittently turned on and off. The intermittent on and off operations of the second switch element SW2 allows the charge on the capacitor 6 and the EL element 2 to be discharged toward the power terminal VDD through the switch element S1, second switch element SW2 and coil 4. Because the power terminal VDD is connected to a battery (e.g. 1.5 V), it can be considered that current flows through the battery toward the power terminal VSS. An abrupt discharge is suppressed by the time constant of the coil 4. Each time the second switch element SW2, is turned on, the capacitor 6 and the EL element 2 are discharged slightly to gradually decrease the terminal-to-terminal voltage of the EL element 2. This suppresses the abrupt discharge.

Then, when the discharge ends, the second switch element SW2 is no longer intermittently turned on and off, remaining off, and the switch elements S1 and S4 are turned off. At time t2, immediately thereafter, the switch elements S2 and S3 are turned on and the first switch element SW1 is intermittently turned on and off. As a result, the capacitor 6 is charged and the charging of EL element 2 from the terminal T0 side begins. The terminal-to-terminal voltage of the EL element 2 is gradually increased to approximately 100 V.

Next, at time t3 the first switch element SW1 is no longer intermittently turned on and off, remaining off, and the second switch element SW2 is intermittently turned on and off. The intermittent on and off operation of the second switch element SW2 allows the charges on the capacitor 6 and the EL element 2 to be discharged toward the power terminal VDD through the switch element S3, second switch element SW2 and coil 4. Thus, the terminal-to-terminal voltage of the EL element 2 gradually decreases.

When the discharge is complete, the second switch element SW2 is no longer intermittently turned on and off, remaining off, and switch elements S2 and S3 are turned off.

Thereafter, the EL element 2 is driven by repeating this procedure from the time t0.

As described above, in the present embodiment the charge on the EL element 2 is intermittently discharged through the coil 4, thus suppressing abrupt discharge, noise and burning of electrodes. Also, the switch element can be made smaller in size.

Note that, if the second switch element SW2 is set to gradually increase the duration during which it is in the on position, abrupt discharge is suppressed by decreasing discharge at the initial time when the EL element 2 has a high terminal-to-terminal voltage. Also, the voltage waveform of the EL element 2 terminal-to-terminal voltage is put close to a sine wave, improving the drive efficiency of the EL element 2.

The present invention is not limited to the structure of the above-described first embodiment.

Figure 3:
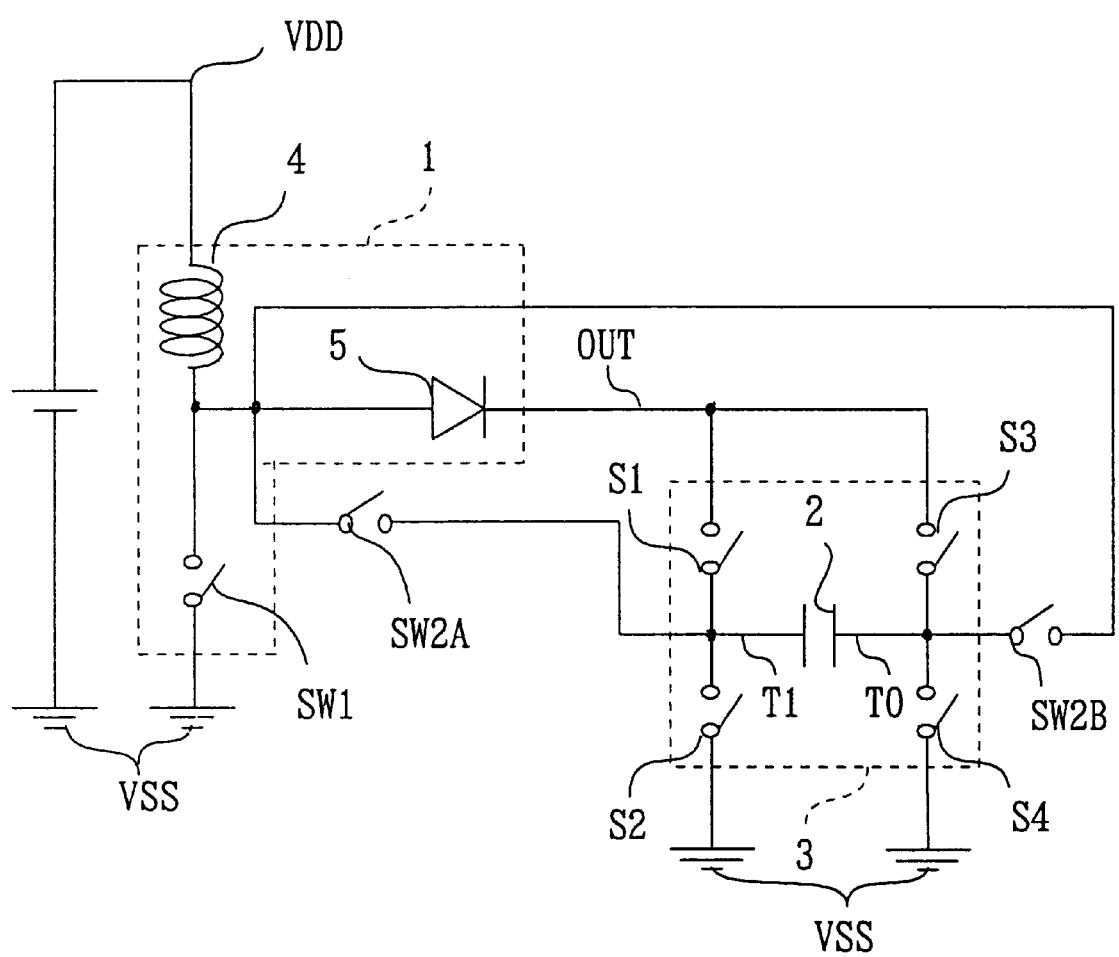
FIG. 3 is a diagram of the structure of a second embodiment of the present invention.

A second embodiment is shown in FIG. 3. Incidentally, in FIG. 3 and the subsequent figures, the same reference characters of FIG. 1 denote the same components. The second embodiment is configured to cause the charge on the EL element 2 to be discharged without passing through the switch elements S1 or S3. For this reason, SW2A and SW2B are provided as the second switch element. This embodiment operates similarly to the first embodiment except that the second switch elements SW2A and SW2B are alternately used depending on a direction of charging of the EL element 2, thus providing a similar effect to that of the first embodiment.

Figure 4:
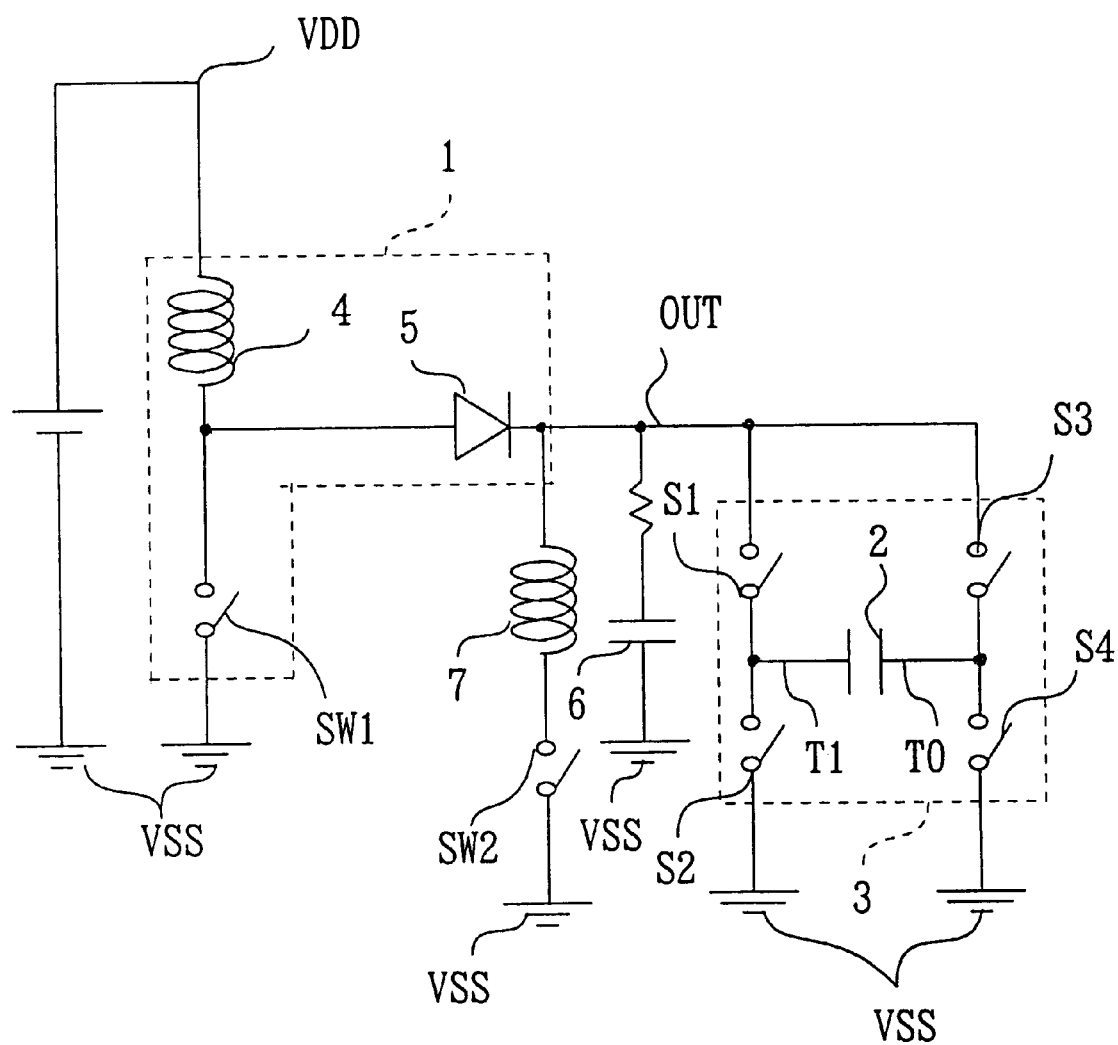
FIG. 4 is a diagram of the structure of a third embodiment of the present invention.

Next, a third embodiment is shown in FIG. 4. This embodiment is separately provided with a coil 7 for discharge. The coil 7 and a second switch element SW2 are connected in series between the output terminal OUT and the power terminal VSS. In this embodiment, each switch element is operated as shown in the timing chart of FIG. 2 to cause discharge from the EL element 2 toward the power terminal VSS through the coil 7. This embodiment also provides a similar effect to that of the first embodiment.

Figure 5:
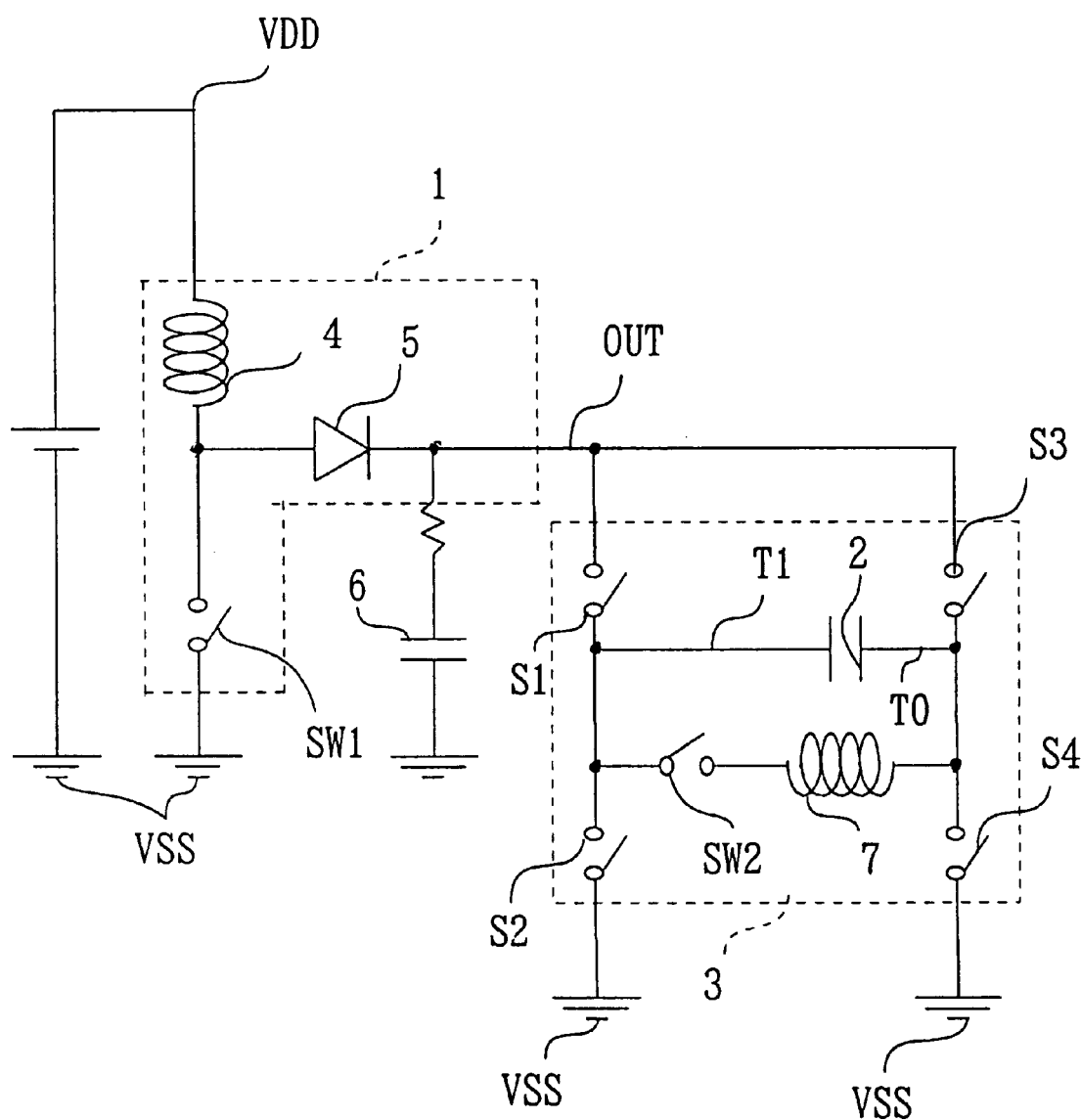
FIG. 5 is a diagram of the structure of a fourth embodiment of the present invention.
Figure 6:
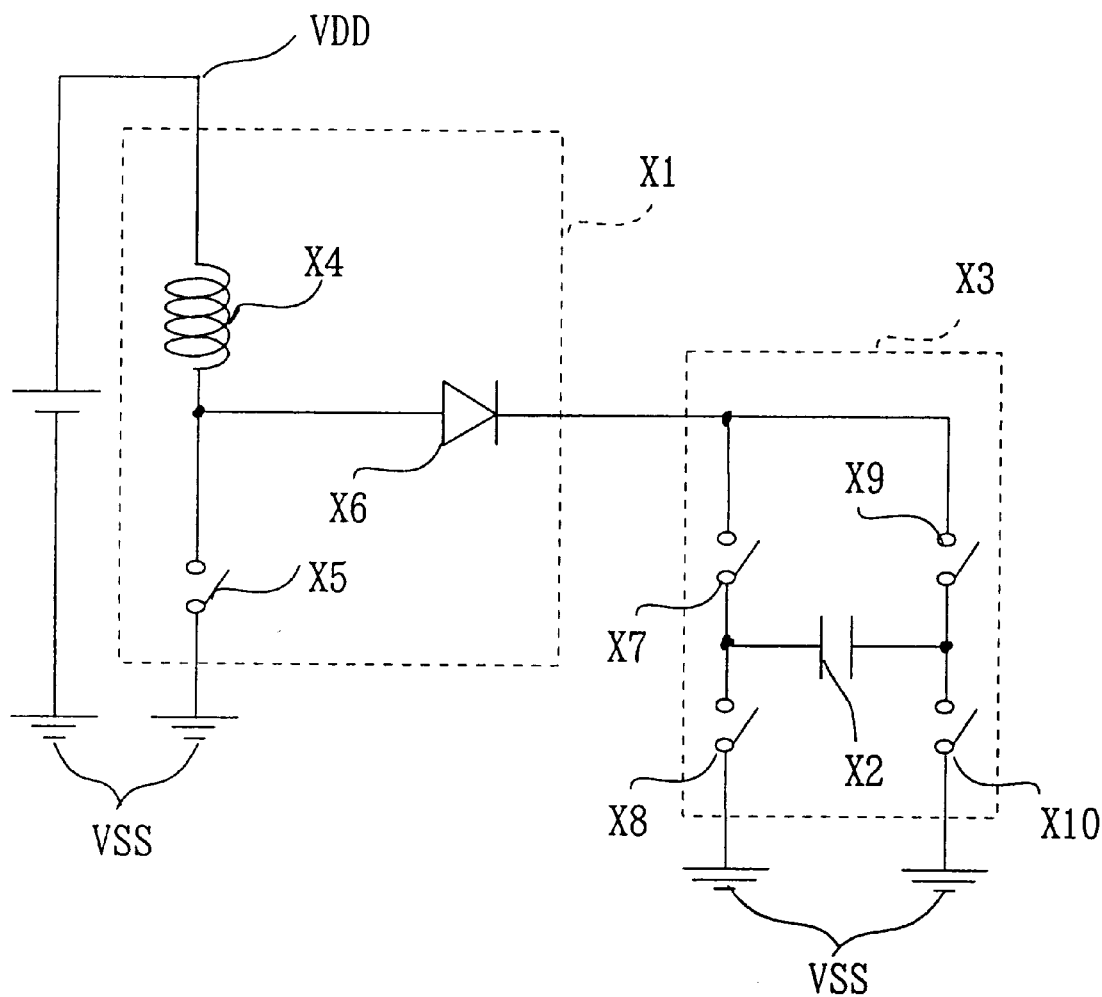
FIG. 6 is a diagram of the structure of an example of the prior art.
Figure 7:
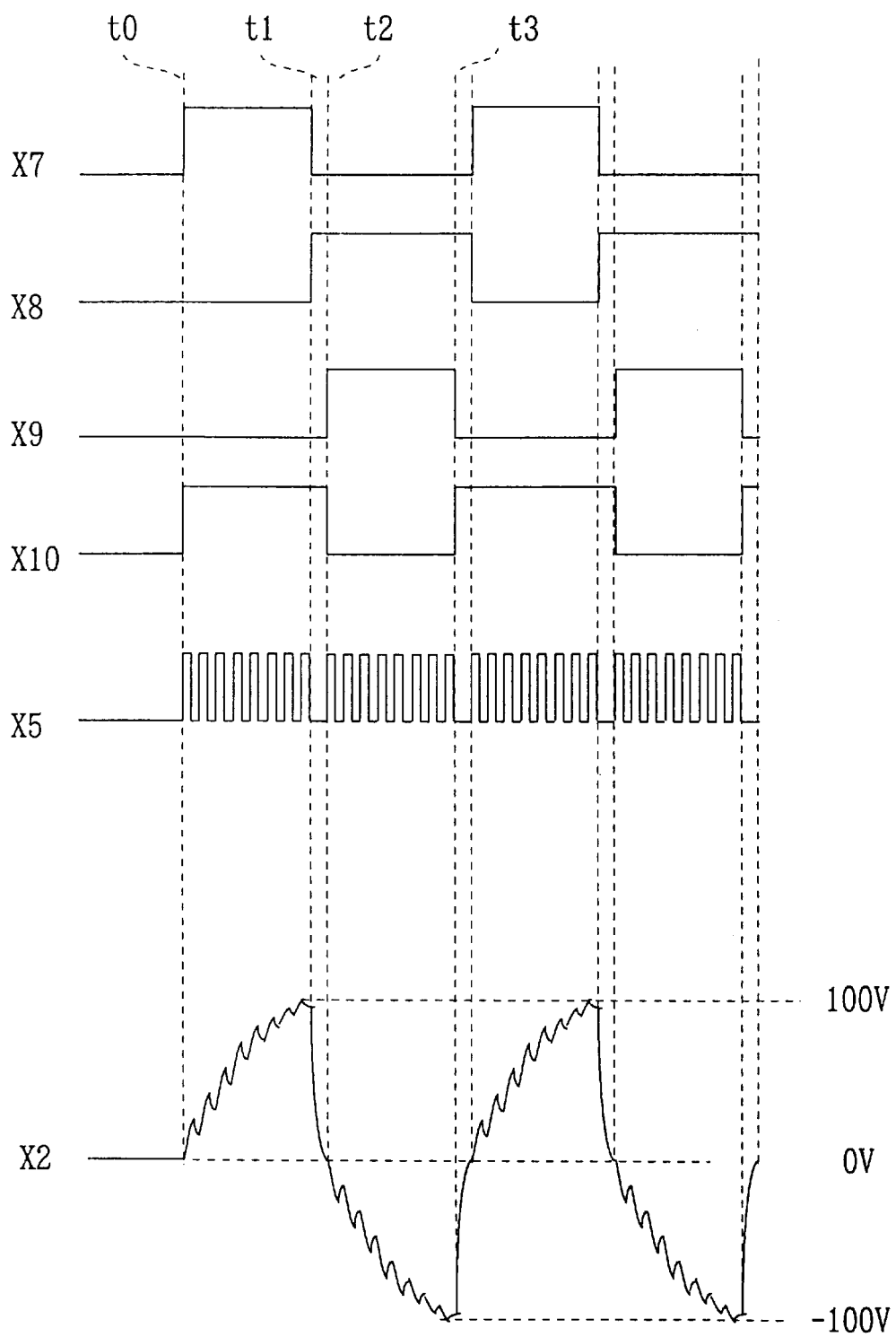
FIG. 7 is a timing chart for the operation of FIG. 6.

FIG. 5 shows a fourth embodiment. This embodiment is also provided with a separate discharge coil 7, similar to the third embodiment. However, the arrangement is different from that of the third embodiment. In the present embodiment, the series connection of the coil 7 and a second switch element SW2 is connected in parallel with the EL element 2. As for operation of the present embodiment, each switch element is operated as shown in the timing chart of FIG. 2 to cause discharge from the EL element 2 through the coil 7 toward the power terminal VSS. The present embodiment also provides a similar effect to that of the first embodiment.

According to the present invention, a coil and a switch element are provided on a discharge path for an EL element so that the switch element is kept in the on position for an appropriate duration to cause intermittent discharge through the coil, thereby suppressing the EL element from abruptly discharging. Due to this, it is possible to suppress noise and electrode burning and reduce the size of the switch element, e.g. by use of bipolar transistors or MOS transistors.

Also, if the second switch element has its intermittent on duration gradually increased, abrupt discharge can be suppressed because discharge is reduced at the initial time when the EL element is high in voltage between its respective terminals. Simultaneously, the waveform of the voltage between the terminals of the EL element 2 is caused to be close to a sine wave, and the drive efficiency of the EL element is improved.

What is claimed is:

1. In a drive circuit for an EL element, a method of operation comprising:

gradually charging said EL element to increase a terminal-to-terminal voltage of said EL element to a required voltage for driving said EL element;

discharging said EL element through a discharge path, wherein a coil and a switch element are provided on said discharge path of said EL element, and said switch element is operated in the on position for a duration to cause intermittent discharge through said coil; and repeating said charging and discharging.

2. A drive circuit for an EL element, comprising:

a first switch element for intermittently connecting for a first time period a coil between a first power source and a second power source having a potential lower than said first power source to cause an induced voltage on said coil;

an H bridge circuit for connecting an EL element, in alternating directions, between a terminal to output said induced voltage and a terminal of said second power source; and a second switch element for intermittently connecting a terminal on a higher potential side of said EL element charged by said induced voltage to said coil in a second time period after said first time period, to cause said EL element to discharge through said coil.

3. A drive circuit for an EL element according to claim 2, wherein said induced voltage is supplied to said EL element while a capacitor is also charged, and a charge voltage of said capacitor is discharged together with discharge of said EL element through said coil.

4. A drive circuit for an EL element according to claim 3, wherein said intermittent discharge time is gradually increased.

5. A drive circuit for an EL element according to claim 2, wherein said intermittent discharge time is gradually increased.

6. A drive circuit for an EL element, comprising:

a first switch element for intermittently connecting for a first time period a first coil between a first power source and a second power source having a potential lower than said first power source to cause an induced voltage on said coil;

an H bridge circuit for connecting an EL element in alternating directions between a terminal to output said induced voltage and a terminal of said second power source; and a second switch element for intermittently connecting a terminal on a higher potential side of said EL element charged by said induced voltage to a second coil in a second time period after said first time period, to cause said EL element to discharge through said coil.

7. A drive circuit for an EL element according to claim 6, wherein said induced voltage is supplied to said EL element while a capacitor is being charged also, and a charge voltage of said capacitor being discharged together with discharge of said EL element through said second coil.

8. A drive circuit for an EL element according to claim 7, wherein said intermittent discharge time is gradually increased.

9. A drive circuit for an EL element according to claim 6, wherein said intermittent discharge time is gradually increased.

10. A drive circuit for an EL element, comprising:

means for gradually charging said EL element to increase a terminal-to-terminal voltage of said EL element to a required voltage for driving said EL element; and means for discharging said EL element through a discharge path, wherein a coil and a switch element are provided on said discharge path of said EL element, and said switch element is operated in the on position for a duration to cause intermittent discharge through said coil.

* * * * *